(12) United States Patent
Pikul et al.

(10) Patent No.: US 9,103,218 B2
(45) Date of Patent: Aug. 11, 2015

(54) TURBINE SHROUD

(75) Inventors: Bartlomiej Pikul, Tarnow (PL);
Krzysztof Sypien, Wielopole Skrz. (PL);
Bartlomiej Wasciszakowski, Dunajcem (PL)

(73) Assignee: MTU Aero Engines GmbH, Munich (DE)

( * ) Notice: Subject to any disclaimer, the term of this patent is extended or adjusted under 35 U.S.C. 154(b) by 419 days.

(21) Appl. No.: 13/174,199

(22) Filed: Jun. 30, 2011

(65) Prior Publication Data
US 2012/0003078 A1    Jan. 5, 2012

(30) Foreign Application Priority Data

Jul. 1, 2010  (EP) .................................... 10168157

(51) Int. Cl.
*F01D 11/12*  (2006.01)
*F01D 5/22*  (2006.01)
*F01D 5/20*  (2006.01)

(52) U.S. Cl.
CPC . *F01D 5/225* (2013.01); *F01D 5/20* (2013.01); *F01D 11/122* (2013.01); *F01D 11/127* (2013.01); *F05B 2240/33* (2013.01); *F05D 2260/941* (2013.01)

(58) Field of Classification Search
CPC ......... F01D 5/225; F01D 11/08; F01D 11/12; F01D 11/122; F01D 11/127; F01D 5/20; F05D 2260/941; F05B 2240/33
USPC .......... 415/173.4, 173.5, 173.6; 416/189–192
See application file for complete search history.

(56) References Cited

U.S. PATENT DOCUMENTS

| | | | | |
|---|---|---|---|---|
| 5,154,581 | A * | 10/1992 | Borufka et al. ............... | 416/190 |
| 5,531,568 | A * | 7/1996 | Broadhead .................... | 416/191 |
| 6,491,498 | B1 | 12/2002 | Seleski et al. | |
| 7,037,075 | B2 * | 5/2006 | Townes et al. ............... | 416/191 |
| 2005/0079058 | A1 * | 4/2005 | Paquet et al. ................ | 416/191 |

FOREIGN PATENT DOCUMENTS

| | | | | |
|---|---|---|---|---|
| JP | 2005-207294 A | * | 8/2005 | ............... F01D 5/22 |
| WO | WO 2005/008032 A1 | | 1/2005 | |

OTHER PUBLICATIONS

Machine translation of JP-2005-207294, Aug. 4, 2005.

* cited by examiner

*Primary Examiner* — Christopher Verdier
(74) *Attorney, Agent, or Firm* — Crowell & Moring LLP

(57) ABSTRACT

A turbine blade assembly is disclosed. The turbine blade assembly includes a turbine blade and an outer shroud section at the radially outer end of the turbine blade. The turbine blade intersects or joins the shroud section. For increased stiffness, the shroud section has a reinforcing rib extending along its outer face and extending substantially in the direction of the principal axis of inertia.

14 Claims, 4 Drawing Sheets

PRIOR ART

TURBINE SHROUD

This application claims the priority of European Patent Document No. 101 68 157.5, filed Jul. 1, 2010, the disclosure of which is expressly incorporated by reference herein.

BACKGROUND AND SUMMARY OF THE INVENTION

The present invention relates to turbine shroud designs, in particular for low-pressure turbines of turbine engines.

It is common to incorporate an expanded section at the outer ends of turbine blades, these expanded ends interlocking to form a ring or shroud, which assists in support of the blades, in sealing and in reducing vibrations. However, the shroud itself adds considerable weight.

In order to reduce the weight of the shroud, pockets can be introduced, as shown for example in U.S. Pat. No. 6,491,498. These are effective in reducing weight but do not take sufficiently into account dynamic loads.

Such an outer shroud section 1 is shown in FIG. 1, as a top view in the radial direction. The outer shroud 1 comprises two sealing fins 2 and 3 extending in the circumferential direction and arranged parallel to one another as shown at the top and at the bottom of FIG. 1. Between the two fins 2 and 3 on the left-hand side and on the right, "Z-notches" 4 and 5, i.e., interlocking Z-shaped boundary walls, having edges 8, are arranged so that they frame the pocket 6 mentioned above. This pocket is effective in reducing weight but does not take sufficiently into account dynamic load. Therefore the outer shroud will bend around a bending axis A. Additionally a rib 7 extending substantially in the direction of the bending axis A is arranged in the pocket 6. Such a reinforcement does not help to avoid or reduce the above-mentioned drawback.

The object of the invention is to reduce the bending tendency of the outer shrouds of turbine blades.

Thus, according to the invention, there is provided a turbine blade having an outer shroud section at the radially outer end, the blade intersecting the shroud section, wherein the shroud section has at least one reinforcing rib extending along its outer face, wherein the rib extends substantially in the direction of the principal axis of inertia.

The invention aims to reduce stress levels at the outer shroud (OS), especially at Z-notch areas by placing OS reinforcement ribs on the airfoil Imax bending axis. A more efficient use of OS reinforcement reduces the shroud mass and consequently the blade weight and overall mechanical loads. The approach is particularly suited for High-Speed LPTs with large shrouds (low airfoil count) where the centrifugal loads dominate, causing high radial bending stresses.

The transverse rib or ribs at the top of the shroud, more or less perpendicular to the airfoil bending axis, ensure a high resistance against radial folding. Hence stresses from bending are reduced. This solution proves very effective in the case of a flat outer annulus profile, where the structure is particularly prone to bending. This structure advantageously reduces mechanical loading and consequently weight.

This configuration affords the maximum reinforcement for a given mass. There can be two, or three or more, evenly spaced ribs. The shroud may further have one, or preferably two, circumferentially extending sealing fins, also on the outer face of the shroud, for sealing with a soft part, e.g., a honeycomb, of the turbine housing. The ribs can then extend between these two fins or fin walls, but having a lesser height.

The invention also contemplates a rotor, and an engine, using such blades.

For a better understanding of the invention, embodiments of it will now be described, by way of example, with reference to the accompanying drawings.

DETAILED DESCRIPTION OF THE DRAWINGS

Observations of the deformation of the outer shrouds of LPT's lead to the conclusion that flat shrouds are very prone to bending. This is valid especially for high-speed turbines, where huge centrifugal forces act on the structure. The OS tends to fold about a bending axis. This causes high compressive stresses at the top of the shroud and additionally increases tensile stresses at z-notches. Usually the bending axis position corresponds to the Imin axis of the shroud or of the uppermost section of the airfoil. Positioning of the rib perpendicular to this bending axis should provide optimal bending stiffness and decrease OS stress level.

Figure 5:
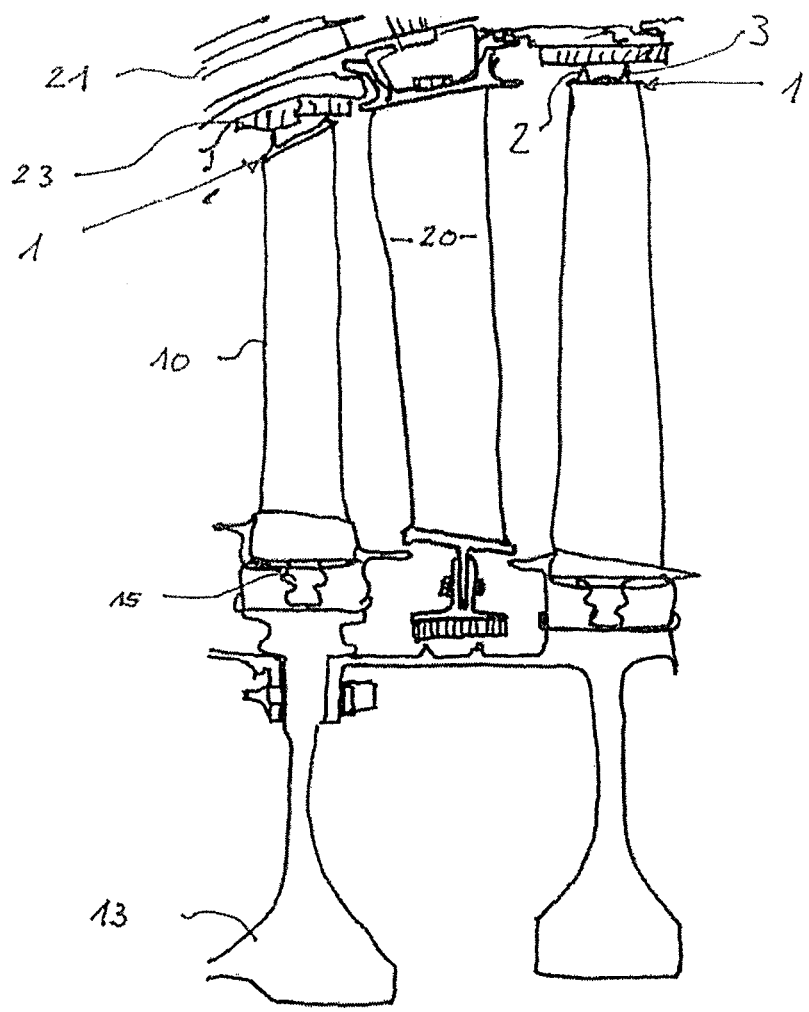
FIG. 5 shows a section through part of a typical turbine, showing two rotary blades and one vane.

FIG. 5 shows a partial section through a typical turbine. Two blade wheels or rotors are shown, each with blades 10, attached via roots 15 to a respective hub 13. The hub rotates around the turbine axis, towards the bottom of the drawing, as the blades 10 are acted on by expanding gas passing thorough the turbine housing 21. Between the two blade sets is a further set of stationary vanes 20, fixed to the housing.

Figure 1:
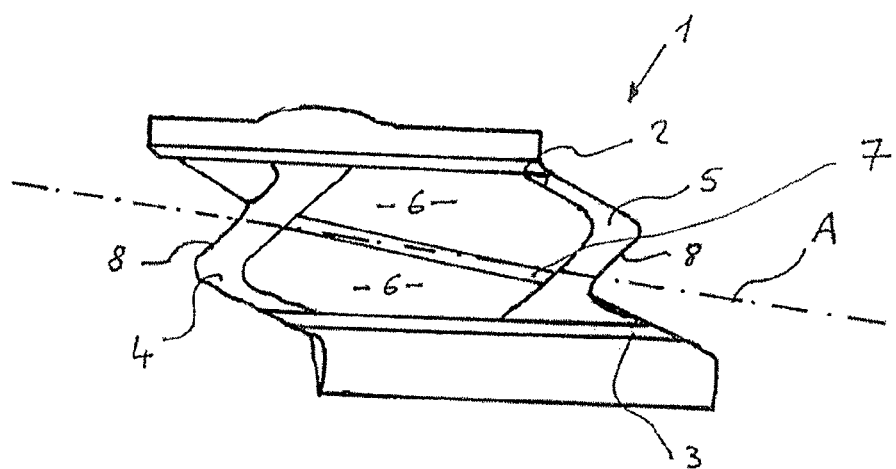
FIG. 1 shows an elevational view of a detail of a known shroud in the radial direction.
Figure 4:
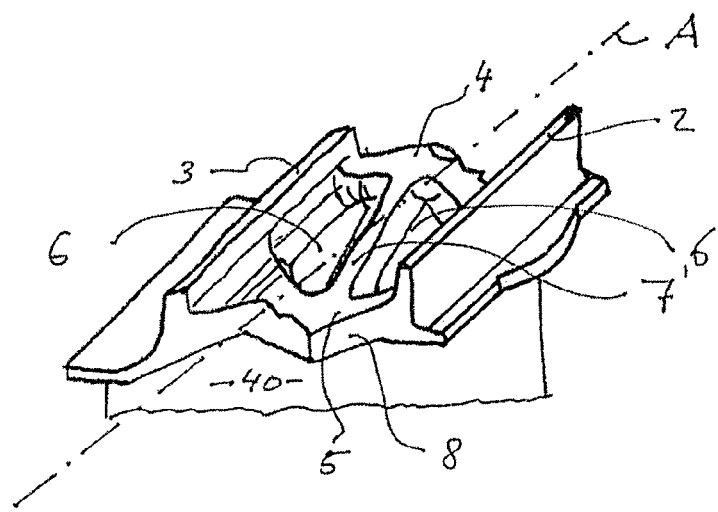
FIG. 4 shows a perspective view of a detail of a shroud with a dog-bone configuration.

Extending round the tips of each set of blades is a shroud, made up of individual sections 1 formed integrally with the tips of the blades. These shroud sections are shown in FIGS. 1 and 4 for typical arrangements, in plan view and perspective view, as already discussed. As can be seen, each shroud section 1 interlocks with circumferentially adjacent sections to either side (not shown), by a Z-shaped or notched wall 4 and 5, having edges 8, so as to form a continuous shroud extending round the complete circumference.

Also running circumferentially are two sealing fins 2 and 3, which engage into a honeycomb 23 on the housing to form a seal.

Because the blades tend to be oblique to the airflow, and moreover twist along their length, the line of intersection of the blade with the shroud is oblique to the rotor axis.

To minimise weight, the shroud thickness (in the radial direction) should be as small as possible. However, this renders it prone to bending under dynamic load around the bending axis A. As can be seen, the edges 8 of the shroud section, adjacent to the next sections, are reinforced with upstanding walls 4 and 5, so that there is a recessed or hollowed-out area or a pocket 6 bounded by these edges 8 and by the Z-notches 4 and 5.

In order to reinforce the shroud section, a reinforcement rib 7 extending substantially along the bending axis A has been inserted, as shown in FIG. 1.

The reinforcement rib 7' in FIG. 4 differs from that in FIG. 1 in being slightly tilted away from the bending axis A. Also visible are the fins 2 and 3, between which the ribs 7 or 7' extend; the ribs have approximately half the height of the fins (and the same height as the walls 4, 5).

However, neither this nor the FIG. 1 configuration prevents bending of the shroud section 1.

According to the results of FEM analysis, the "dog-bone" configuration does not significantly improve the bending stiffness of the OS. The rib is placed nearly along the bending axis and has only small impact on the stresses in the shroud.

FIGS. 2 and 3 show elevational and perspective views of a detail of a shroud section of two different embodiments of the invention.

Figure 2A:
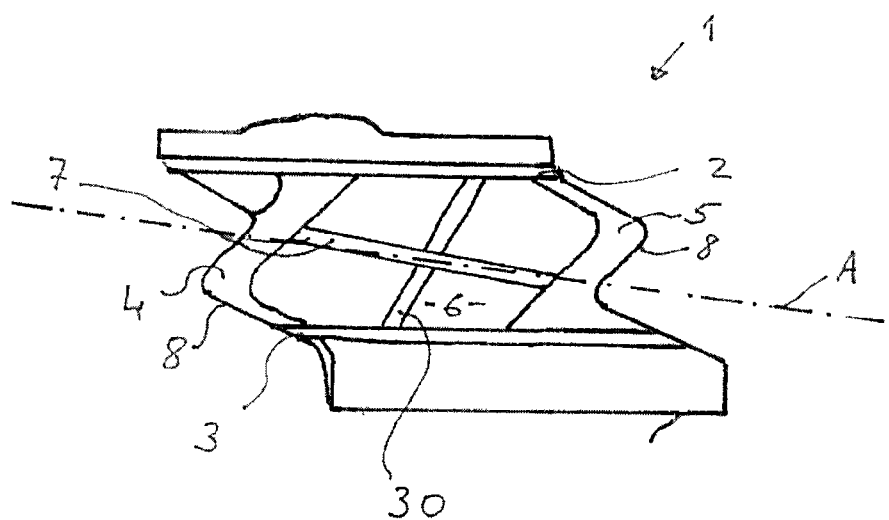
FIGS. 2A and 2B show elevational and perspective views of a detail of a shroud according to one embodiment of the invention.
Figure 2B:
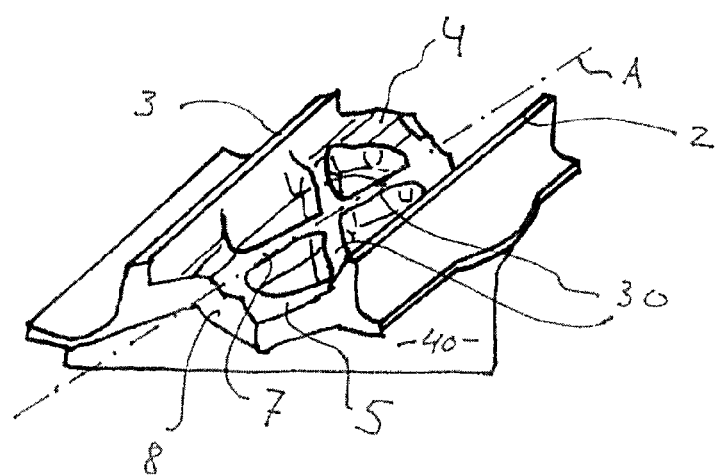

FIGS. 2A and 2B show the same configuration as in FIG. 1 but a second reinforcement rib 30 has been added to the shroud section 1. This second reinforcing rib 30 extends along the maximum principal axis of inertia of the uppermost airfoil section 40, or of the outer shroud section, or an average of both.

The configuration with crossed ribs proves much better in this role. However it has been found that only one of the ribs (the transverse one) takes most of the bending stresses, whereas the second one behaves more like a classical "dog-bone rib".

The transverse-rib configuration proved the best one among all the checked variants. This configuration provides significant bending stiffness and reduces stress level both in the shroud as well as at the Z-notches 4 and 5.

In fact the first reinforcement rib 7 can be omitted. In such a case the thickness of the second rib 30 has to be adapted accordingly.

Figure 3A:
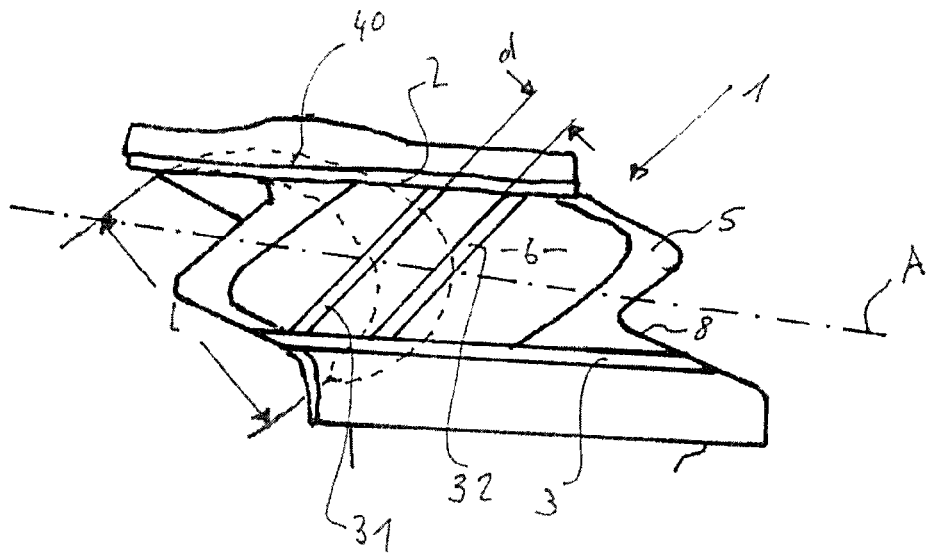
FIGS. 3A and 3B show elevational and perspective views of a detail of a shroud according to another embodiment of the invention.
Figure 3B:
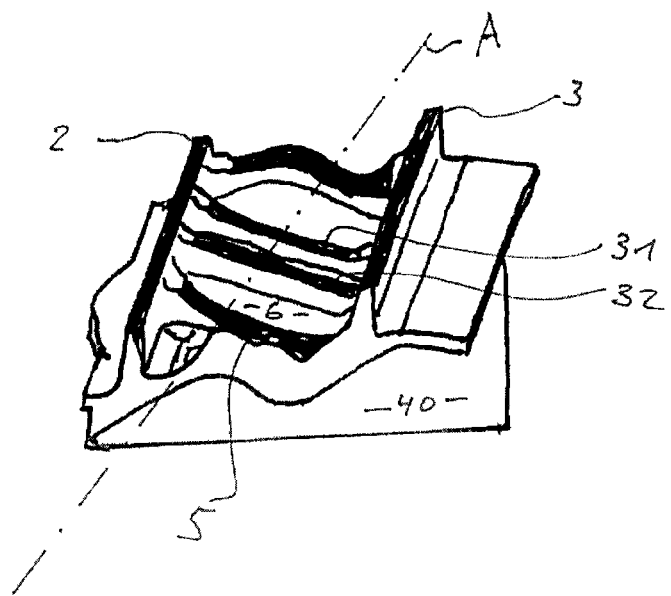

The second embodiment of the invention, employing this principle, is shown in FIGS. 3A and 3B. The outer shroud section 1 shown comprises two second ribs 31 and 32, parallel to each other and also extending along the maximum principal axis of inertia. The axis of inertia and the bending axis A can be determined by finite-element analysis of the airfoil or of the outer shroud section.

Additionally the first reinforcement rib 7 extending along the bending axis can be added to this configuration if desired.

The distance d between the two second ribs 31 and 32 can be between 0 and 60% of the chord length l of the blade profile or airfoil profile 40 shown as a dashed line in FIG. 3A.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A turbine rotor blade assembly, comprising:
   a turbine rotor blade; and
   a shroud section at a radially outer end of the turbine rotor blade, wherein the shroud section has:
   a first sealing fin and a second sealing fin extending in a circumferential direction of the shroud section, wherein the first sealing fin is parallel to the second sealing fin;
   a first Z-shaped wall and a second Z-shaped wall extending between the first and second sealing fins;
   a first rib extending along an outer face of the shroud section, wherein the first rib extends substantially in a direction of a principal axis of inertia of the turbine rotor blade, substantially perpendicular to a bending axis of the shroud section, and extends across the turbine rotor blade; and
   a second rib, wherein the first and second ribs extend parallel to one another and are disposed between the first and second Z-shaped walls;
   wherein pockets are defined by the first and second sealing fins and the first and second ribs.

2. The turbine rotor blade assembly according to claim 1, wherein the principal axis of inertia is a principal axis of inertia of an uppermost airfoil section or a principal axis of inertia of the shroud section or an average of both the principal axis of inertia of the uppermost airfoil section and the principal axis of inertia of the shroud section.

3. The turbine rotor blade assembly according to claim 1, wherein a distance between the first and second ribs lies between 0 and 60% of a chord length of a profile of the turbine rotor blade.

4. The turbine rotor blade assembly according to claim 1, further comprising a third rib, wherein the third rib extends substantially along the bending axis of the shroud section.

5. The turbine rotor blade assembly according to claim 1, wherein the first and second ribs extend substantially perpendicular to a circumferential axis of the shroud section.

6. The turbine rotor blade assembly according to claim 1, wherein the first and second ribs extend substantially perpendicular to a circumferential direction of the shroud section.

7. The turbine rotor blade assembly according to claim 1, wherein the first and second ribs extend radially outwardly along the outer face of the shroud section.

8. A turbine rotor assembly, comprising:
   a rotor hub;
   a plurality of turbine rotor blades attached to the rotor hub;
   wherein each of the plurality of turbine rotor blades includes a respective shroud section at a radially outer end of a respective turbine rotor blade, wherein each shroud section has:
   a first sealing fin and a second sealing fin extending in a circumferential direction of the shroud section, wherein the first sealing fin is parallel to the second sealing fin;
   a first Z-shaped wall and a second Z-shaped wall extending between the first and second sealing fins;
   a first rib extending along an outer face of the shroud section, wherein the first rib extends substantially in a direction of a principal axis of inertia of the turbine rotor blade, substantially perpendicular to a bending axis of the shroud section, and extends across the turbine rotor blade; and
   a second rib, wherein the first and second ribs extend parallel to one another and are disposed between the first and second Z-shaped walls;
   wherein pockets are defined by the first and second sealing fins and the first and second ribs.

9. The turbine rotor assembly according to claim 8, wherein the principal axis of inertia is a principal axis of inertia of an uppermost airfoil section or a principal axis of inertia of the shroud section or an average of both the principal axis of inertia of the uppermost airfoil section and the principal axis of inertia of the shroud section.

10. The turbine rotor assembly according to claim 8, wherein a distance between the first and second ribs lies between 0 and 60% of a chord length of a profile of the turbine rotor blade.

11. The turbine rotor assembly according to claim 8, further comprising a third rib, wherein the third rib extends substantially along the bending axis of the shroud section.

12. The turbine rotor assembly according to claim 8, wherein the first and second ribs extend substantially perpendicular to a circumferential axis of the shroud section.

13. The turbine rotor assembly according to claim 8, wherein the first and second ribs extend substantially perpendicular to a circumferential direction of the shroud section.

14. The turbine rotor assembly according to claim 8, wherein the first and second ribs extend radially outwardly along the outer face of the shroud section.

* * * * *